United States Patent
Wu et al.

(10) Patent No.: US 10,323,177 B2
(45) Date of Patent: Jun. 18, 2019

(54) COMBO HYDRAULIC FRACTURING FLUID CONCENTRATE HAVING BOTH DRAG REDUCTION AND SAND-CARRYING PROPERTIES

(71) Applicant: Yangtze University, Jingzhou (CN)

(72) Inventors: Jun Wu, Houston, TX (US); Wei-Chu Yu, Jingzhou (CN)

(73) Assignee: YANGTZE UNIVERSITY, Jingzhou (CN)

(*) Notice: Subject to any disclaimer, the term of this patent is extended or adjusted under 35 U.S.C. 154(b) by 17 days.

(21) Appl. No.: 15/792,742

(22) Filed: Oct. 24, 2017

(65) Prior Publication Data

US 2018/0112125 A1  Apr. 26, 2018

(30) Foreign Application Priority Data

Oct. 25, 2016 (CN) .......... 2016 1 0934355

(51) Int. Cl.
  *C09K 8/88* (2006.01)
  *C09K 8/68* (2006.01)
  *C09K 8/66* (2006.01)
  *C09K 8/80* (2006.01)
  *E21B 43/267* (2006.01)

(52) U.S. Cl.
  CPC .............. *C09K 8/882* (2013.01); *C09K 8/665* (2013.01); *C09K 8/68* (2013.01); *C09K 8/80* (2013.01); *C09K 8/88* (2013.01); *E21B 43/267* (2013.01); *C09K 2208/28* (2013.01)

(58) Field of Classification Search
  None
  See application file for complete search history.

(56) References Cited

U.S. PATENT DOCUMENTS

| | | | | |
|---|---|---|---|---|
| 10,081,753 B2* | 9/2018 | Wu | ........................ | C09K 8/05 |
| 2012/0132423 A1* | 5/2012 | Livanec | ................ | C09K 8/524 |
| | | | | 166/279 |
| 2013/0153225 A1* | 6/2013 | Livanec | .................. | C09K 8/04 |
| | | | | 166/300 |
| 2013/0324443 A1* | 12/2013 | Wang | ................... | C04B 24/163 |
| | | | | 507/121 |
| 2015/0368538 A1* | 12/2015 | Wang | ...................... | C09K 8/24 |
| | | | | 175/65 |

* cited by examiner

*Primary Examiner* — John J Figueroa
(74) *Attorney, Agent, or Firm* — Hemisphere Law, PLLC; Zhigang Ma

(57) ABSTRACT

A combo hydraulic fracturing fluid concentrate, is characterized by 1) firstly preparing "water-in-water" dispersion polymer drag reducer A, which is synthesized via dispersion polymerization to obtain water-soluble macromolecular colloidal particles dispersed in an aqueous solution of inorganic salts; 2) secondly, adding a dispersion B, which is a polymeric viscosifier, having shear-thinning properties, dispersed in aqueous inorganic salt solution; wherein the percentage by weight of drag reducing agent to viscosifier dispersion B is 20-80:80-20.

6 Claims, No Drawings

COMBO HYDRAULIC FRACTURING FLUID CONCENTRATE HAVING BOTH DRAG REDUCTION AND SAND-CARRYING PROPERTIES

BACKGROUND OF THE INVENTION

1. Field of the Invention

The present invention relates to a combo hydraulic fracturing fluid concentrate, especially relates to a combo hydraulic fracturing fluid concentrate having both drag reduction and sand-carrying properties.

2. Description of Related Arts

With the exploration and production of shale oil and gas, the key technology which is hydraulic fracturing has been studied extensively. During hydraulic fracturing, the fracturing fluid is often desired to have both excellent sand-carrying and drag reduction properties. Only under these conditions, fracturing fluid can achieve effective pressure curtailing and reservoir permeability enhancement. However, the reality is that: to effectively fracture, fluid must be kept at very low viscosity to ensure good pump-ability and adequate momentum to penetrate deep downhole.

However, low-viscosity fluids are not effective at carrying sands/proppants, especially under static states. On the other hand, sands/proppants are indispensable during fracking so that the freshly opened fractures may be propped up by these sand/proppants. Sand-carrying is often achieved by increasing the viscosity of the fracturing fluid. Unfortunately, the increase of viscosity inevitably dampens the drag reduction performance. For example, the drag reducer's performance may drop from 70%, when viscosity is low, to only 30% when viscosity is high. The dilemma persists until today, which is that the apex performances of viscosifier and drag reducer do no coexist. In other words, when a fluid is effective at sand-carrying, it won't be ample for drag reduction and vice versa. Therefore, the research and development of a combo hydraulic fracturing fluid having both excellent drag reduction and sand-carrying properties is expected to render far-reaching impact on shale gas industry.

SUMMARY OF THE INVENTION

A combo hydraulic fracturing fluid concentrate having both drag reduction and sand-carrying properties, is realized by 1) firstly preparing "water-in-water" dispersion polymer drag reducer A, which is synthesized via dispersion polymerization to obtain water-soluble macromolecular colloidal particles dispersed in an aqueous solution of inorganic salts; 2) secondly, adding to the above-mentioned drag reducer A, a dispersion B, which is a polymeric viscosifier, having shear thinning properties, dispersed in aqueous inorganic salt solution; wherein the percentage by weight of drag reducing agent A to viscosifier dispersion B is 20-80:80-20; wherein the drag reducing agent A is obtained by dispersion polymerization at elevated temperature with heating a homogenous solution containing water-soluble monomer A1, water-soluble dispersant A2, water-soluble free radical initiator A3, inorganic salt A4, and water A5, under mechanical agitation; wherein the weight percentages of each component described above, with respect to the total weight of drag reducer A, are as the following: water-soluble monomer A1: 5.0-20.0%; water-soluble dispersant A2: 0.1-5.0%; water-soluble radical initiator A3: 0.000001-0.100%; inorganic salt A4: 15.0-40.0%; water A5: remainder; wherein the said shear-thinning viscosifier dispersion B is composed of shear-thinning polymer B1, inorganic salt B2 and water B3; wherein the weight percentages of each component based on the total weight of the viscosifier dispersion B are: shear-thinning polymer B1: 0.1-30.0%; inorganic salt B2: 10.0-50.0%; water B3: remainder.

The present invention is advantageous in that it provides a combo hydraulic fracturing fluid concentrate having both drag reduction and sand-carrying properties, which solves the dilemma persists until today, which is the ace performances of viscosifier and drag reducer do no coexist. In other words, when a fluid is good at sand-carrying, it won't be adequate for drag reduction and vice versa. Therefore, the invention of a combo hydraulic fracturing fluid concentrate having both excellent drag reduction and sand-carrying properties is expected to render far-reaching impact on shale gas industry.

DETAILED DESCRIPTION OF THE INVENTION

The following specific embodiments in conjunction with the present invention will be further described in the preparation of 200.0 kg of said concentrate having both drag reduction and sand-carrying properties, with drag reducer A being 100.0 kg and shear-thinning hydrophilic polymer dispersion B being 100.0 kg.

The objective of the present invention is to provide a combo hydraulic fracturing fluid concentrate having both drag reduction and sand-carrying properties, which is realized by formulating a "water-in-water" dispersion polymer drag reducer A, composed of water-soluble macromolecules dispersed in aqueous inorganic salt solution, with a dispersion system B composed of shear-thinning polymeric viscosifier in aqueous inorganic salt solution. This concentrate is readily dissolvable in fresh or saline water for fracking operations. Under static conditions, this fluid can carry sands/proppants to prevent settling. Whereas under dynamic conditions, due to the shear-thinning property of the viscosifier, the viscosity of the resultant fracking fluid is dramatically reduced, preserving the intrinsic pump-ability and drag reduction capability of the drag reducer itself.

A combo hydraulic fracturing fluid concentrate having both drag reduction and sand-carrying properties, is realized by 1) firstly preparing "water-in-water" dispersion polymer drag reducer A, which is synthesized via dispersion polymerization to obtain water-soluble macromolecular colloidal particles dispersed in an aqueous solution of inorganic salts; 2) secondly, adding to the above-mentioned drag reducer A, a dispersion B, which is a polymeric viscosifier, having shear thinning properties, dispersed in aqueous inorganic salt solution; wherein the percentage by weight of drag reducing agent A to viscosifier dispersion B is 20-80:80-20; wherein the drag reducing agent A is obtained by dispersion polymerization at elevated temperature with heating a homogenous solution containing water-soluble monomer A1, water-soluble dispersant A2, water-soluble free radical initiator A3, inorganic salt A4, and water A5, under mechanical agitation; wherein the weight percentages of each component described above, with respect to the total weight of drag reducer A, are as the following: water-soluble monomer A1: 5.0-20.0%; water-soluble dispersant A2: 0.1-5.0%; water-soluble radical initiator A3: 0.000001-0.100%; inorganic salt A4: 15.0-40.0%; water A5: remainder; wherein the said shear-thinning viscosifier dispersion B is composed of shear-thinning polymer B1, inorganic salt B2 and water B3; wherein the weight percentages of each component based on the total weight of the viscosifier dispersion B are: shear-thinning polymer B1: 0.1-30.0%; inorganic salt B2: 10.0-50.0%; water B3: remainder.

The water-soluble monomer A1 is selected from one or more of the group consisting of hydroxyethyl acrylate, hydroxyethyl methacrylate, hydroxypropyl acrylate, hydroxypropyl methacrylate, ethoxylated-2-hydroxyethyl acrylate, ethoxylated-2-hydroxyethyl methacrylate, hydroxymethyl styrene, vinyl acetate, acrylamide, dimethyl diallyl ammonium chloride, [2-(methacryloyloxy)ethyl] trimethylammonium chloride, [2-(acryloyloxy)ethyl]trimethylammonium chloride; (3-acrylamidopropyl)trimethylammonium chloride, [3-(methacryloylamino)propyl] trimethylammonium chloride, acryloxyethyldimethylbenzyl ammonium chloride, methacryloxyethyldimethylbenzyl ammonium chloride, acrylic acid, sodium acrylate, potassium acrylate, methacrylic acid, sodium methacrylate, potassium methacrylate, 2-acrylamido-2-methylpropanesulfonic acid, 2-acrylamido-2-methylpropane sulfonate sodium salt, and 2-acrylamido-2-methyl propane sulfonic acid potassium salt.

The water-soluble dispersing agent A2 is one or more of the dispersants selected from water-soluble dispersants including poly {[2-(methacryloyloxy)ethyl]trimethylammonium chloride}, poly {[2-(acryloyloxy)ethyl]trimethylammonium chloride}, poly(vinyl benzyl trimethyl ammonium chloride), poly(dimethyl diallyl ammonium chloride), hydrolyzed polyacrylamide and hydrolyzed poly(vinyl acetate).

The water-soluble radical A3 is one or more of initiators selected from the group consisting of water-soluble initiators including ammonium persulfate, sodium persulfate, potassium persulfate, hydrogen peroxide, 2,2'-azobisisobutylamidine dihydrochloride, 2,2'-azo[2-(2-imidazolin-2-yl) propane] dihydrochloride, and 4,4'-azobis(4-cyanovaleric acid).

The inorganic salt A4 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

The shear-thinning polymer B1 is selected from one or more of the shear-thinning hydrophilic polymers including xanthan gum and guar gum, and their mixture at any ratio thereof.

The inorganic salt B2 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

The above-described drag reducing agent A is prepared by using water-soluble monomers exclusively. Further, the drag reducing agents may be water-soluble macromolecules modified with hydrophobic or fluorocarbon moieties. Based on the technical solutions described above, mutual solvent A6 and hydrophobic monomer A7, or mutual solvent A6 and fluorinated monomer A8, can be introduced to the original homogenous aqueous solution, before the subsequent dispersion polymerization takes place at elevated temperature under mechanical agitation. Thus, the resultant polymer chains possess hydrophobic or fluorocarbon moieties on its backbone to minimize intermolecular and molecular-reservoir friction coefficient.

The mutual solvent A6 is one or more of the mutual solvents selected from the group consisting of mutual solvents including ethylene glycol monobutyl ether, dimethyl formamide, and alcohol derivatives, aldehyde derivatives, ketone derivatives, ether derivatives and other derivatives of dimethyl sulfoxide.

The hydrophobic monomer A7 is one or more of hydrophobic monomers selected from the group of hydrophobic monomers comprising methyl acrylate, methyl methacrylate, ethyl acrylate, ethyl methacrylate, propyl acrylate, propyl methacrylate, butyl acrylate, butyl methacrylate, and styrene.

The fluorocarbon-containing monomer A8 is one or more of the fluorocarbon monomers selected from the group of fluorocarbon monomers including pentafluorophenyl acrylate, 1,1,1,3,3,3-hexafluoro isopropyl acrylate, 1H,1H,3H-hexafluorobutyl acrylate, 2,2,2-trifluoroethyl acrylate, and perfluorodecyl acrylate.

A mix of fluorocarbon surfactant A9 and water-soluble small or macromolecular quaternary ammonium-containing clay stabilizer A10, can be introduced to the dispersion polymer drag reducer A before or after polymerization; or the mix of fluorocarbon surfactant A9 and water-soluble small or macromolecular quaternary ammonium-containing clay stabilizer A10 may be introduced to the combo fracturing fluid concentrate system via pre-mixing with the shear-thinning polymer dispersion B before adding to the dispersion A.

The water-soluble fluorocarbon surfactants A9 is one or more of the surfactants selected from the group consisting of water-soluble anionic fluorocarbon surfactants, water-soluble cationic fluorocarbon surfactant, water-soluble nonionic fluorocarbon surfactant, water-soluble zwitterionic fluorocarbon surfactant, and water-soluble Gemini fluorocarbon surfactant, including perfluorooctanoic acid, lithium perfluorooctanate, sodium perfluorooctanate, potassium perfluorooctanate, ammonium perfluorooctanate, perfluorooctane sulfonic acid, lithium perfluorooctane sulfonate, sodium perfluorooctane sulfonate, and potassium perfluorooctane sulfonate.

The water-soluble quaternary ammonium-containing clay stabilizer A10 is one or more of the quaternary ammonium-based clay stabilizers selected from the group consisting of water-soluble quaternary ammonium small molecules or macromolecules including tetramethylammonium chloride, choline chloride, butyl trimethylammonium chloride, octyl trimethyl ammonium chloride, dodecyl trimethyl ammonium chloride, cetyl trimethyl ammonium chloride, and poly(dimethyl diallyl ammonium chloride).

Example 1

The weights and percentages of water-soluble monomer A1, water-soluble dispersant A2, water-soluble free radical initiator A3, inorganic salt A4, and water A5, for preparing drag reducer A, are as the following: water-soluble monomer A1: 2-hydroxyethyl acrylate, 1.0 kg; vinyl acetate, 2.0 kg; acrylamide, 4.0 kg; sodium acrylate, 3.0 kg; water-soluble monomer A1 accounts for 10% of the total weight of all the reaction mixture for drag reducer A; water-soluble dispersant A2: poly (2-methacryloyloxyethyl) trimethylammonium chloride, 1.0 kg; poly (2-acryloyloxyethyl) trimethylammonium chloride 1.0 kg; poly-2-acrylamido-2-methylpropane sulfonate, 2.0 kg; water-soluble dispersant A2 accounts for 4.0% of the total weight of all reactants for drag reducer A; water-soluble radical initiator A3: ammonium persulfate, 0.00010 kg, which is accounts for 0.0001% to the total weight of the reactants for A; inorganic salts A4: sodium chloride, 10.0 kg; ammonium chloride, 5.0 kg; ammonium bicarbonate, 5.0 kg; ammonium sulfate, 10.0 kg; inorganic salts A4 accounts for 30% of the total weight of the reactants for drag reducer A; water A5 is 55.9999 kg of water, accounting for 55.9999% of the total weight of the reactants for A.

The above-mentioned water-soluble monomers A1, water-soluble dispersant A2, water-soluble free radical initiator A3, inorganic salts A4, and water A5 are mixed and heated to 60-80° C. under mechanical agitation to initiated dispersion polymerization, which gives a dispersion-polymer-based drag reducer A.

The weights and percentages of shear-thinning hydrophilic polymer B1, inorganic salts B2 and water B3 are as the following: shear-thinning polymer B1: xanthan gum, 10.0 kg, which accounts for 10.0% of the total weight of the dispersion B; inorganic salt B2: sodium chloride, 10.0 kg; ammonium chloride, 5.0 kg; ammonium bicarbonate, 5.0 kg; of ammonium sulfate, 10.0 kg; inorganic B2 accounts for 30.0% of the total weight of the reactants for B; B3 is 60.0 kg water, 60.0% of the total weight of the ingredients for B.

The shear-thinning polymer B1, inorganic salts B2 and water B3 are homogenized for one hour under mechanical agitation to generate dispersion B.

The xanthan gum viscosifier dispersion B is added to the drag reducing agent A, under mechanical agitation to obtain a combo slick water concentrate having drag reduction and sand-carrying properties concurrently.

Example 2

The weights and percentages of water-soluble monomer A1, water-soluble dispersant A2, water-soluble free radical initiator A3, inorganic salt A4, mutual solvent A6, hydrophobic monomer A7 and water A5, are as the following: water-soluble monomer A1: 2-hydroxyethyl acrylate, 1.0 kg; vinyl acetate, 2.0 kg; acrylamide, 4.0 kg; sodium acrylate, 3.0 kg; water-soluble monomer A1 accounts for 10.0% of all the reaction mixture for A; water-soluble dispersant A2: poly (2-methacryloyloxyethyl) trimethylammonium chloride, 1.0 kg; poly (2-methacryloyloxyethyl) trimethylammonium chloride, 1.0 kg; poly-2-acrylamido-2-methylpropane sulfonate ammonium salt, 2.0 kg; water-soluble dispersant A2 accounts for 4.0% of the total weight of all reactants for A; water-soluble radical initiator A3: ammonium persulfate, 0.00010 kg, which is 0.0001% of the total weight of the reactants for A; inorganic salt A4: sodium chloride, 10.0 kg; ammonium chloride, 5.0 kg; ammonium bicarbonate, 5.0 kg; ammonium sulfate, 10.0 kg; inorganic salts A4 accounts for 30% of the total weight of the reactants for A; mutual solvent A6: ethylene glycol monobutyl ether, 10.0 kg, which is 10.0% of the total weight of the reaction for A; hydrophobic monomer A7: butyl acrylate, 1.0 kg, which is 1.0% of the total weight of the reactants for A; water A5 is 44.9999 kg, representing 44.9999% of the total weight of the reactants for A.

The above-mentioned water-soluble monomers A1, water-soluble dispersant A2, water-soluble free radical initiator A3, inorganic salt A4, mutual solvents A6, hydrophobic monomers A7 and water A5 are mixed and heated to at 60-80° C. under rapid mechanical stirring to initiate dispersion polymerization, for obtaining drag reducer A 100.0 kg.

The weights and percentages of shear-thinning hydrophilic polymer B1, inorganic salt B2, and water B3 for dispersion B, are as the following: shear-thinning polymer B1: guar gum 10.0 kg, which accounts for 10.0% of the total weight of the system B; inorganic salt B2: sodium chloride, 10.0 kg; ammonium chloride, 5.0 kg; ammonium bicarbonate, 5.0 kg; ammonium sulfate, 10.0 kg; inorganic salt B2 accounts for 30.0% of the total weight of the reactants for B; water B3 is water, 60.0 kg, which accounts for 60.0% of the total weight of the ingredients for B.

The shear-thinning polymer B1, inorganic salts B2 and water B3 are homogenized for one hour under mechanical agitation to generate dispersion B.

The guar gum viscosifier dispersion B is added to the drag reducing agent A, under mechanical agitation to obtain a combo of slick water concentrate having drag reduction and sand-carrying properties concurrently. In this example, the drag reducing agent is composed of hydrophobically-modified low-damaging macromolecules.

Example 3

The weights and percentages of water-soluble monomer A1, water-soluble dispersant A2, water-soluble free radical initiator A3, inorganic salt A4, mutual solvent A6, fluorocarbon-containing monomer A8 and water A5, are as the following: water-soluble monomer A1: 2-hydroxyethyl acrylate, 1.0 kg; vinyl acetate, 2.0 kg; acrylamide, 4.0 kg; sodium acrylate, 3.0 kg; water-soluble monomer A1 accounts 10.0% of the total weight of the reaction mixture for A; water-soluble dispersant A2: poly (2-methacryloyloxyethyl) trimethylammonium chloride, 1.0 kg; poly (2-acryloyloxyethyl) trimethyl ammonium chloride, 1.0 kg; poly-2-acrylamido-2-methylpropane sulfonate, 2.0 kg; water-soluble dispersant A2 accounts for 4.0% of the total weight of all reactants for A; water-soluble radical initiator A3: ammonium persulfate, 0.00010 kg, representing 0.00010% of the total weight of the reactants for A; inorganic salt A4: sodium chloride, 10.0 kg; ammonium chloride, 5.0 kg; ammonium bicarbonate, 5.0 kg; ammonium sulfate, 10.0 kg; inorganic slats A4 accounts for 30.0% of the total weight of the reactants for A; mutual solvent A6: ethylene glycol monobutyl ether, 10.0 kg, accounting for 10.0% of the total weight of the reactants for A; fluorocarbon monomer A8: perfluorodecyl acrylate, 1.0 kg, representing 1.0% of the total weight of the reactants for A; water A5 is 44.9999 kg, representing 44.9999% of the total weight of the reactants for A.

The above-mentioned water-soluble monomers A1, water-soluble dispersant A2, water-soluble free radical initiator A3, inorganic salt A4, mutual solvents A6, fluorocarbon-containing monomer A8 and water A5 are mixed and heated to at 60-80° C. under rapid mechanical stirring to initiate dispersion polymerization, for obtaining drag reducer A 100.0 kg.

The weights and percentages of shear-thinning hydrophilic polymer B1, inorganic salts B2, and water B3 are as the following: shear-thinning polymer B1: xanthan gum, 10.0 kg, which is 10.0% of the total weight of the dispersion B; inorganic salt B2: sodium chloride, 10.0 kg; ammonium chloride, 5.0 kg; ammonium bicarbonate, 5.0 kg; ammonium sulfate, 10.0 kg; inorganic salts B2 accounts for 30.0% of the total weight of the reactants for B; B3 is 60.0 kg water, 60.0% of the total weight of the ingredients for B.

The shear-thinning polymer B1, inorganic salts B2 and water B3 are homogenized for one hour under mechanical agitation to generate dispersion B.

The xanthan gum viscosifier dispersion B is added to the drag reducing agent A, under mechanical agitation to obtain a combo of slick water concentrate having drag reduction and sand-carrying properties concurrently. In this example, the drag reducing agent is composed of fluorocarbon-modified low-damaging macromolecules.

The present invention is advantageous in that it provides a combo hydraulic fracturing fluid concentrate having both excellent drag reduction and sand-carrying properties, which solves the dilemma persists until today, which is the ace performances of viscosifier and drag reducer do no coexist. In other words, when a fluid is good at sand-carrying, it won't be adequate for drag reduction and vice versa. Therefore, the invention of a combo hydraulic fracturing fluid concentrate having both drag reduction and sand-carrying properties is expected to render far-reaching impact on shale gas industry.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A combo hydraulic fracturing fluid concentrate, characterized by 1) firstly preparing "water-in-water" dispersion polymer drag reducer A, which is synthesized via dispersion polymerization to obtain water-soluble macromolecular colloidal particles dispersed in an aqueous solution of inorganic salts; 2) secondly, adding a dispersion B, which is a polymeric viscosifier, having shear-thinning properties, dispersed in aqueous inorganic salt solution; wherein the percentage by weight of drag reducing agent to viscosifier dispersion B is 20-80: 80-20;

wherein, the drag reducing agent A is obtained by dispersion polymerization at elevated temperature with heating a homogenous solution containing water-soluble monomer A1, water-soluble dispersant A2, water-soluble free radical initiator A3, inorganic salt A4, and water A5, under mechanical agitation; wherein, the weight percentages of each component described above, with regard to the total weight of reactant mixture for preparing drag reducer A, are as the following: water-soluble monomers A1: 5.0-20.0%; water-soluble dispersant A2: 0.1-5.0%; water-soluble radical initiator A3: 0.000001-0.100%; inorganic salt A4: 15.0-40.0%; water A5: remainder, wherein the water-soluble monomer A1 is hydroxyethyl acrylate, the water-soluble dispersant A2 is poly {[2-(methacryloyloxy)ethyl]trimethylammonium chloride};

wherein the viscosifier dispersion B is composed of shear-thinning polymer B1, inorganic salt B2 and water B3; wherein the weight percentages of each component based on the total weight of the viscosifier dispersion B are: shear-thinning polymer B1: 0.1-30.0%; inorganic salt B2: 10.0-50.0%; water B3: remainder, wherein the shear-thinning polymer B1 is xanthan gum.

2. The combo hydraulic fracturing fluid concentrate as described in claim 1, wherein the water-soluble free radical initiator A3 is one or more of initiators selected from the group consisting of water-soluble initiators including ammonium persulfate, sodium persulfate, potassium persulfate, hydrogen peroxide, 2,2'-azobisisobutylamidine dihydrochloride, 2,2'-azo[2-(2-imidazolin-2-yl) propane] dihydrochloride, and 4,4'-azobis(4-cyanovaleric acid).

3. The combo hydraulic fracturing fluid concentrate as described in claim 1, wherein the inorganic salt A4 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

4. The combo hydraulic fracturing fluid concentrate as described in claim 1, wherein the inorganic salt B2 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chloride, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

5. The combo hydraulic fracturing fluid concentrate as described in claim 1, wherein during the preparation of the dispersion polymer drag reducer A having a drag reduction and sand carrying properties, mutual solvent A6 and hydrophobic monomer A7, or mutual solvent A6 and fluorocarbon-containing monomer A8 may be introduced to the homogeneous solution before polymerization takes place at elevated temperature; thus, the resultant dispersion polymer drag reducer A is a drag reducer basing upon hydrophobic or fluorocarbon-modified water-soluble macromolecules; wherein the mutual solvent A6 is ethylene glycol monobutyl ether; wherein the hydrophobic monomer A7 is methyl acrylate, methyl methacrylate wherein the fluorocarbon-containing monomer A8 is pentafluorophenyl acrylate.

6. The combo hydraulic fracturing fluid concentrate as described in claim 1, wherein a mix of fluorocarbon surfactant A9 and water-soluble small or macromolecular quaternary ammonium-containing clay stabilizer A10, can be introduced to the dispersion polymer drag reducer A before or after polymerization; or the mix of fluorocarbon surfactant A9 and water-soluble small or macromolecular quaternary ammonium-containing clay stabilizer A10 may be introduced to the combo fracturing fluid concentrate via pre-mixing with the shear-thinning polymer dispersion B; wherein, the said water-soluble fluorocarbon surfactants A9 is water-soluble anionic fluorocarbon surfactants; wherein, the said water-soluble quaternary ammonium-containing clay stabilizer A10 is tetramethylammonium chloride.

\* \* \* \* \*